United States Patent [19]

Frontino

[11] Patent Number: 5,010,242

[45] Date of Patent: Apr. 23, 1991

[54] METHOD AND APPARATUS FOR VARIABLE SPEED SCANNING OF BAR CODES

[75] Inventor: Louis J. Frontino, Cherry Hill, N.J.

[73] Assignee: Mars Incorporated, McLean, Va.

[21] Appl. No.: 349,090

[22] Filed: May 8, 1989

[51] Int. Cl.⁵ .............................................. G06K 7/10
[52] U.S. Cl. .................................... 235/467; 235/462; 235/472
[58] Field of Search ....................... 235/462, 472, 467; 250/566, 568

[56] References Cited

U.S. PATENT DOCUMENTS

| | | |
|---|---|---|
| 3,902,048 | 8/1975 | Fleischer et al. . |
| 4,032,888 | 6/1977 | Broyles et al. . |
| 4,251,798 | 2/1981 | Swartz et al. . |
| 4,333,006 | 6/1982 | Gorin et al. . |
| 4,360,798 | 11/1982 | Swartz et al. . |
| 4,387,297 | 6/1983 | Swartz et al. . |
| 4,409,470 | 10/1983 | Shepard et al. . |
| 4,460,120 | 7/1984 | Shepard et al. . |
| 4,808,804 | 2/1989 | Krichever et al. . |
| 4,816,661 | 3/1989 | Krichever et al. . |

Primary Examiner—Harold Pitts
Attorney, Agent, or Firm—Davis Hoxie Faithfull & Hapgood

[57] ABSTRACT

Method and apparatus are provided for scanning an optically readable code such as a bar code at a variable scanning velocity. Such variable velocity scanning has the effect of normalizing the density of code elements to be scanned thereby eliminating the need for the scanner operator during the course of bar code decoding to vary the distance between the scanner and the optical code for a predetermined range of code element densities.

27 Claims, 9 Drawing Sheets

METHOD AND APPARATUS FOR VARIABLE SPEED SCANNING OF BAR CODES

BACKGROUND OF THE INVENTION

1. Field Of The Invention

The subject invention pertains generally to method and apparatus for automatically optically scanning coded indicia such as bar codes. In particular, the invention relates to method and apparatus for variable speed scanning of optically readable codes such as bar codes which require minimal operator involvement to achieve successful decoding of bar codes being scanned

2. Description Of The Prior Art

In a variety of present day applications including merchandise warehousing and point-of-sale transactions, information pertaining to the merchandise is obtained by reading data encoded indicia such as an optical code printed on or affixed to the merchandise item These optical codes are typically in the form of UPC or other formats of bar codes having a plurality of linear code elements Various equipment and techniques have been developed for manually reading or automatically scanning and decoding bar codes. Additional discussion of the prior art is included in U.S. application Ser. Nos. 913,098 and 913,215 both filed on Sep. 29, 1986 and assigned to the assignee of the present invention.

The versatility of prior art systems for manually reading or automatically scanning and decoding bar codes has typically been measured by such parameters as the range of densities of bar codes which can be read, the range of distance allowed between the scanning device and the bar code to be scanned, the speed at which the bar code can be read and decoded, and the cost effectiveness of the product. Several techniques have been developed which optimize one or more of these parameters. However, optimization of one or more parameters has typically been achieved at the expense of adequate development of the other parameters, resulting in what may best be described as a compromise suited to only a limited range of applications.

Low cost, compact bar code readers such as those incorporating light pens are available where expense is of primary significance Such readers are typically used in relatively low-volume point-of-sale transactions. The light pens usually use light emitting diodes (LED,s) for providing the scanning signal However, such readers have the disadvantage of being relatively slow and require the operator to position the reader at a fixed distance from the bar code to be read. The light pen must be manually moved across the surface of the bar code at a predetermined speed in order for the bar code to be decoded Because the attainment of the proper speed of pen movement across the bar code is a trial and error process, repeated manual scans are oftentimes required in order to successfully decode the bar code.

Non-contact bar code readers offer a significant advantage over the light pen, especially when an automatic scanning technique is employed For discussions of examples of automatic scanning devices, see, for example, U.S. application Ser. No. 913,215 referred to above and U.S. Pat. No. 4,460,120. Typical automatic scanning devices require only that they be properly aimed at a bar code target which is to be decoded and that they are manually located the correct distance from the target in order to obtain decoding of the bar code. In typical non-contact scanning systems, a mirror is mounted to the shaft of a drive motor such as a stepper motor operable as a galvanometer. The shaft and attached mirror are oscillated about a predetermined position by a fixed regulated DC current in one phase of the stepper motor and a varying current in another phase. Oscillation of the mirror causes an optical beam directed at the mirror to be deflected across the bar code in an oscillating fashion.

In another type of non-contact scanner, such as that disclosed in U.S. Pat. No. 4,032,888, a resonant electromechanical oscillator causes a mirror mounted to a shaft to oscillate at the resonant frequency of the oscillator. A light beam directed at the mirror is reflected and deflected by the mirror so that it scans across the bar code target at the resonant frequency of the oscillator.

A variable distance automatic scanner is disclosed in U.S. Pat. No. 4,333,006. This patent discloses a multifocal holographic scanning system which employs a series of varying focal length holograms generated by a rotating disk to focus at differing overlapping distance ranges from the code to be scanned.

Other scanning systems provide for the decoding of bar codes in a variety of vertical planes relative to the scanner. In U.S. Pat. No. 3,902,048, a rotating polygon is provided in which each face of the polygon has a mirrored surface mounted at an angle which varies from face to face of the polygon. As a result of this arrangement, light directed against the rotating polygon is deflected along a variety of predetermined planes, thereby permitting decoding of bar codes which are substantially normal to the plane of the light emitted by the scanner.

SUMMARY OF THE INVENTION

It is an object of the present invention to provide a scanning device and method of scanning which more cost effectively allows reading of a wide range of code densities, has an extended range of distances allowed for decoding codes of a given code density, and rapidly reads and decodes bar codes of a wide range of densities. More particularly, it is an object of the present invention to provide a relatively inexpensive scanning device which automatically scans and decodes optical codes at a predetermined extended range of distances from the code.

A further object of the subject invention is to provide a scanning device and method capable of decoding optical codes having a variety of densities without any manual adjustment to the position of the scanning device relative to the bar code.

Yet a further object of the subject invention is to provide a totally automatic system and scanning method for decoding optical codes without the need for manual adjustments to the separation distance or vertical alignment of the scanner relative to the code.

These and other objects are achieved by the present invention, which provides method and apparatus for scanning coded indicia such as bar codes. Scanning apparatus according to the invention includes means for generating a light beam, means for deflecting the light beam across the object to be scanned, the object reflecting at least a portion of the light beam back toward the scanning apparatus, means operatively connected to the deflecting means for varying the rate at which the light beam is deflected across the object, and means for processing the reflected portion of the light beam to provide an indication of data characteristic of the scanned object. Preferably, the light beam generating means comprises a laser and the deflecting means comprises at least one reflective surface connected to a shaft rotatably driven by the light beam deflection rate varying means. In a further embodiment of the invention, the light beam deflection rate varying means comprises motor means for rotating the shaft at a plurality of different rotational rates which are preferably arranged in a prescribed sequence.

In a further embodiment of the invention, the objects to be scanned comprise bar codes having a plurality of different densities and the deflection rate varying means is operable to effectively normalize the code densities as a function of time.

In the method according to the invention, the decoding of an optical code such as a bar code is accomplished by generating a light beam and directing the beam toward a reflective surface. The reflective surface is rotated at a first angular velocity to deflect the light beam across the code elements of the bar code. A portion of the deflected light beam that is reflected by the code elements is sensed. The mirror is then rotated at a second angular velocity different from the first angular velocity to deflect the light beam again across the code element. A portion of the light beam deflected at the second angular velocity that is reflected by the code elements is sensed, and the sensed reflected portion from this second scan is evaluated. The process of varying the speed of scanning is repeated as necessary according to a preselected sequence, and the bar code is decoded.

In a further aspect of the inventive method, the light beam is generated by a laser. Another aspect of the inventive method provides that rotation of the reflective surface is effected by motor means driven by a monotonically changing signal, and that the reflective surface comprises a generally flat mirror. In another aspect of the invention, the reflective surface comprises a polygon having a plurality of generally flat, reflecting surfaces that is coupled to a rotatably driven shaft The reflective surfaces may be arranged such that at least two of the surfaces lie in different planes so that the scan line can be moved up or down by the differently angled reflective surfaces.

An additional aspect of the inventive method provides that the sensed portions of the deflected light beam are used to provide feedback control over the rate at which the reflective surface is subsequently rotated.

BRIEF DESCRIPTION OF THE DRAWINGS

Additional advantages and features of the present invention will become apparent and fully understood from a reading of the following detailed description, taken together with the accompanying drawings, in which.

DETAILED DESCRIPTION

Figure 1:
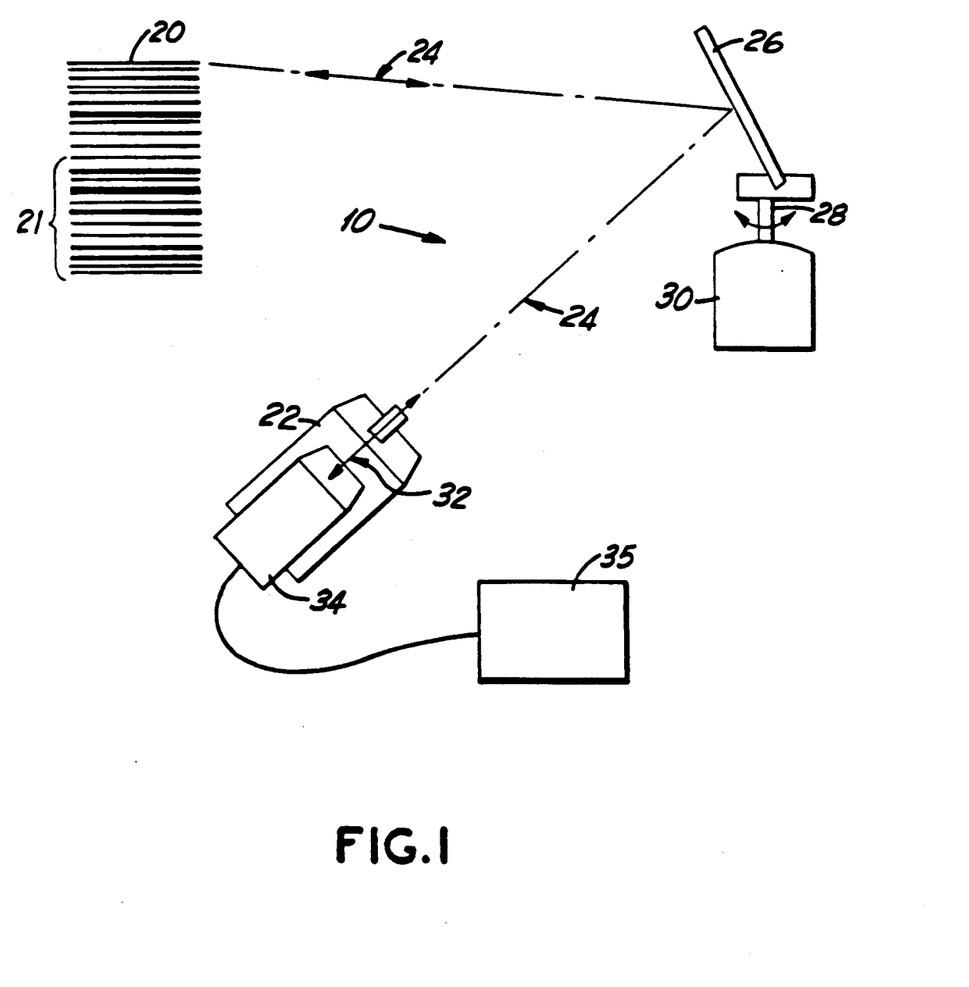
FIG. 1 is a schematic illustration of an optical scanner.

Referring now to the drawings, wherein like reference characters represent similar parts throughout the drawings, and in particular to FIG. 1, an optical character scanner such as a bar code scanner designated generally by numeral 10 is provided for scanning and decoding an optical code such as a bar code 20. It is presently preferred that bar code scanner 10 be of the type described in the commonly assigned U.S. application Ser. No. 913,215, modified to include the variable speed scanning technique taught by the present invention. The disclosure of U.S. application Ser. No. 913,215 is incorporated by reference herein.

FIG. 1 shows a bar code 20 in the form of a series of interleaved bars and spaces of varying widths. Bar code 20 of FIG. 1 is representative of any bar code format comprising a plurality of code elements 21 of differing width Scanner 10 which is shown schematically includes a light source 22, such as a laser diode, capable of generating a collimated light beam 24 toward a mirror 26. Mirror 26 has a concave face (not shown) containing a reflecting flat portion (not shown), and is mounted to a shaft 28 rotatably driven by a motor 30. Rotation of the shaft 28 in first one direction and then back in the other direction causes the flat portion of mirror 26 to rotate back and forth and to deflect light beam 24 across the surface of the bar code 20. At least a portion 32 of light beam 24 is reflected back from the bar code 20 to the concave surface of mirror 26 which focuses and reflects this reflected light to an optical signal receiving means 34 positioned adjacent to the light source 22. Signal receiving means 34 provides data characteristic of the light reflected from the bar code 21 and consequently characteristic of the scanned bar code 21. This data is fed to a processing means 35, such as a suitably programmed microprocessor, which decodes the bar code 21.

Figure 2A:
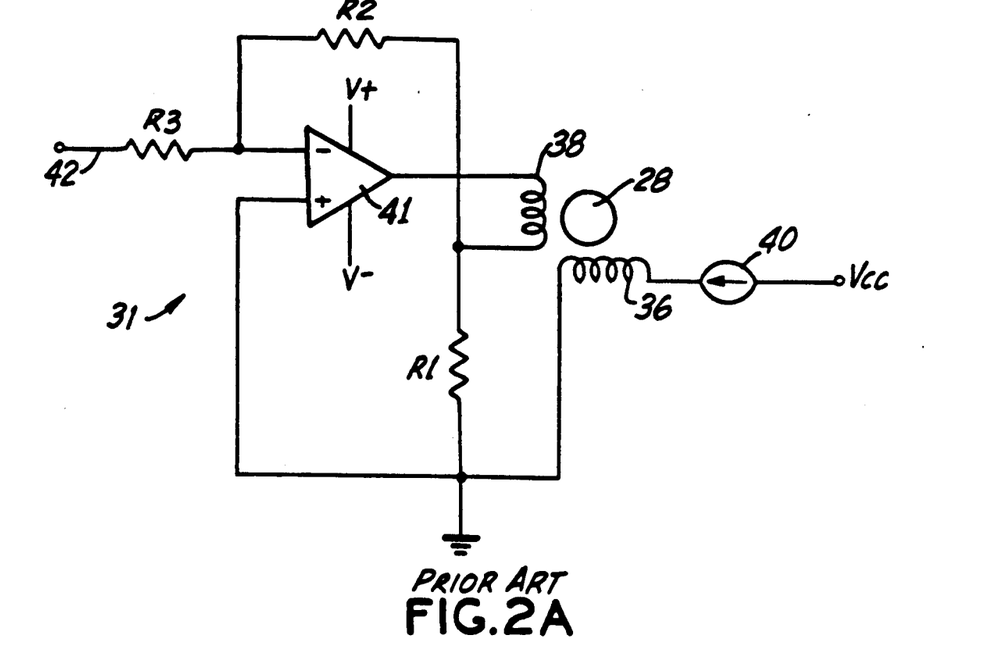
FIGS. 2A and 2B are schematic illustrations of a prior art drive scheme for using a stepper motor as a galvanometer and a voltage drive signal therefor, respectively.
Figure 2B:
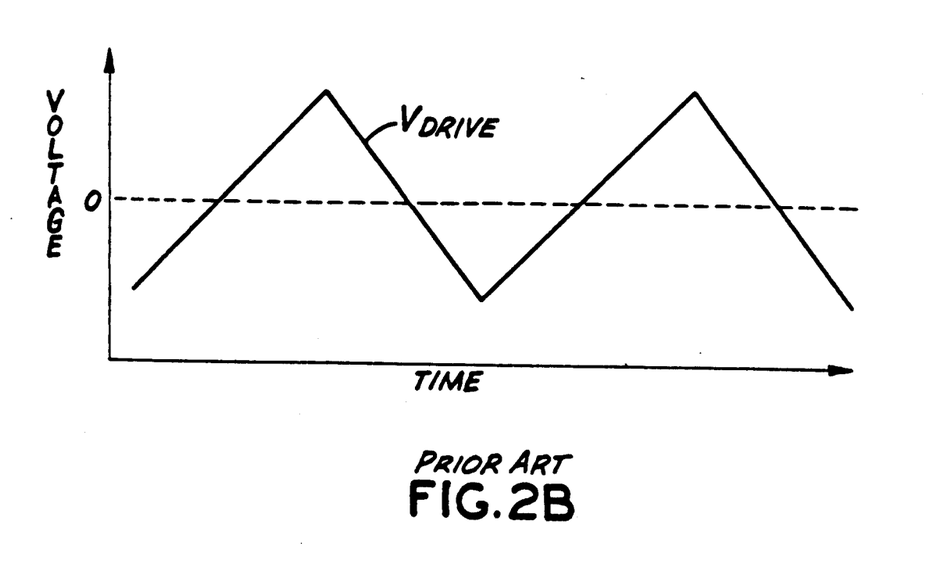

Motor 30 is preferably a stepper motor which is operated as a galvanometer by driving it with a voltage signal having a fixed, regulated D.C. current in one phase and a varying current in the other phase. For background purposes, a prior art arrangement for driving a mirror, such as mirror 26, at a relatively constant angular speed will be briefly discussed FIG. 2A shows a prior art motor drive circuit 31 of the galvanometer type wherein motor shaft 28 of motor 30 is positioned between a pair of opposed magnetic coils 36 and 38, each of which is capable of creating a magnetic field to cause the rotation of motor shaft 28 to which mirror 26 is connected. Coil 36 is connected in series with a constant current regulator 40, which produces a constant D.C. current to coil 36. The motor shaft 28 is in a stable starting position with constant current through coil 36 and no current through coil 38. Coil 38, however is supplied with a varying current as follows. A varying voltage such as that shown in FIG. 2B is applied to input 42 of motor drive circuit 31. This voltage is connected through resistor R3 to the inverting (−) input of operational amplifier driver 41, and through resistors R1 and R2 to a point between coil 38 and resistor R1. The noninverting (+) input of driver 41 is connected to ground as are resistor R1 and coil 36. The output of driver 41 is connected to coil 38. As current is passed through coil 38, the shaft 28 is angularly displaced from its stable starting position. As the current through coil 38 increases in a given direction, the angular displacement of shaft 28 increases in one direction until a maximum displacement, which corresponds to the maximum current in the given direction through coil 38, is reached. After the maximum current is reached, the current begins to decrease, thus decreasing the angular displacement of shaft 28. When the current through coil 38 has decreased to zero amps, the shaft 28 has returned to its starting position Reversing the current through coil 38 then causes the angular displacement of shaft 28 in the opposite direction until the maximum current through coil 38 in the new direction is reached. The resistance values of resistors R1-R3 are selected to provide the desired degree of angular displacement for the system.

A suitable drive voltage $V_{DRIVE}$ for driving mirror 26 at a relatively constant angular velocity is shown in FIG. 2B. As shown in FIG. 2B, the drive voltage $V_{DRIVE}$ is a triangular wave. As known by persons of ordinary skill in the art, the direction of rotation of a mirror such as mirror 26 driven by the drive circuit of FIG. 2A can be related to the varying drive voltage $V_{DRIVE}$ of FIG. 2B. The effect of applying a triangular drive voltage $V_{DRIVE}$ to input 42 of drive circuit 31 of FIG. 2A is to cause the current through coil 38 to angularly displace the shaft 28 in one direction to a maximum displacement corresponding to the peak positive voltage applied to input 42 and then return and pass through its starting position at the zero crossover point, continuing to its maximum displacement in the opposite direction when the maximum negative voltage is applied to input 42. The current in coil 38 is proportional to the drive voltage, $V_{DRIVE}$ applied to input 42.

Further, the angular velocity of the mirror 28 is related to period of the varying drive voltage $V_{DRIVE}$. For example, in order to obtain a frequency of 36 scans per second, one sweep across the bar code must occur approximately every 28 milliseconds (ms). Thus, to achieve a scan frequency of 36 scans per second with alternating scan direction, the period of drive voltage signal $V_{DRIVE}$ should be approximately 56 ms.

Figure 3A:
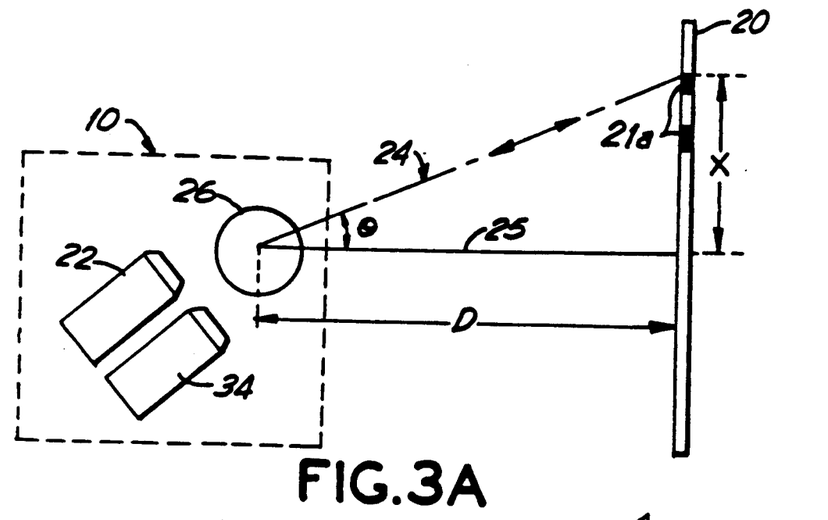
FIGS. 3A and 3B are schematic illustrations of how bar code decoding zones associated with various code element densities may vary.

FIG. 3A shows a bar code element 21a being scanned by bar code scanner 10 with beam 24. FIG. 3A further shows the geometric relationship of (1) the distance, D, between mirror 26 and bar code 20 along normal line 25, (2) the angle of deflection, θ (theta), of beam 24 from normal line 25 and (3) the distance, x, of the scanned spot 21a from the normal line 25. This relationship is governed by the following equation:

$$X = D(\tan\theta) \quad (1)$$

The scanning beam 24 is moved across the surface of the bar code 20 to scan element 21a by the angular displacement of mirror 26. The instantaneous linear spot velocity, V, with which beam 24 moves across the bar code 20 surface is obtained by differentiating the above equation with respect to time as follows:

$$V = dx/dt = d[D(\tan\theta)]/dt \quad (2)$$

therefore:

$$V = D(\sec^2\theta)(d\theta/dt) \quad (3)$$

This equation is further simplified by noting that $d\theta/dt$ is the angular velocity, ω, (omega) at which mirror 26 is being rotated:

$$\omega = d\theta/dt \quad (4)$$

so that:

$$V = D\omega\sec^2\theta \quad (5)$$

When the scanning beam 24 strikes the surface of the bar code 20, at least a portion of it is reflected back to the mirror 26. The mirror then reflects the reflected portion of the beam 24 to the signal receiving means 34 of the bar code scanner 10. The bar code decoding performed by the signal receiving means 34 is a function of many variables, including the instantaneous linear spot velocity, V, discussed above, and the density of the bar code 20. A high density bar code will have a high number of bar code elements 21 in a given area. A lower density bar code will have a lower number of bar code elements in the same given area. For prior art scanning hardware, with a relatively simple decoding algorithm when decoding bar codes having a range of different code densities, the operator was required to intervene to vary D, by moving the scanner closer to or further from the bar code to be scanned This movement of the scanner by the operator changed the instantaneous spot velocity across the bar code. Consequently, a skilled operator could effectively normalize the code element width as a function of time by his movements, so that bar codes of differing densities would appear to the scanner to be within the tolerances of the decoding algorithm. Generally, in this prior art technique, the scanner was moved closer to high density bar code elements and away from low density elements Because bar code element normalization occurred only as a result of varying the distance D between the scanned element and the mirror, it is evident that such normalization occurred, if at all, solely as a result of a trial and error process of movement of the scanner with respect to the bar code. Such "trial and error" scanning processes are not desirable in instances where large numbers of bar codes are to be scanned over a given period of time, where unskilled operators are employed, or in instances where operator access to the bar code is limited so that movement of the scanner relative to the bar code is impeded Instances of limited access occur, for example, in inventory taking in a warehouse, where objects to be scanned are stacked atop one another and in remote areas.

Figure 3B:
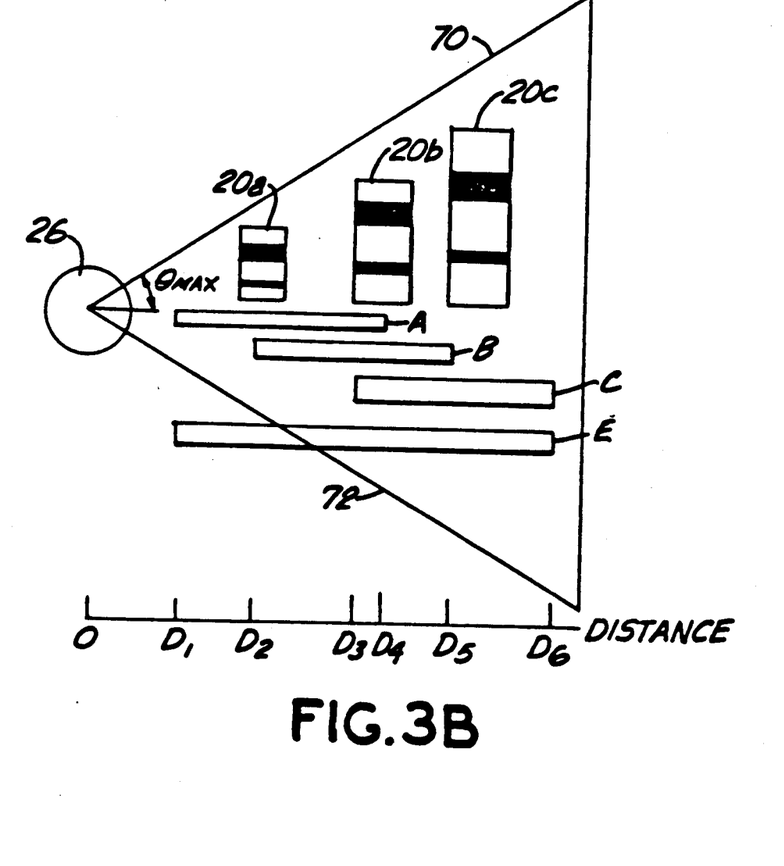

With reference again to FIG. 3B, a number of different density bar codes 20a, 20b and 20c are illustrated. With a prior art laser bar code scanner of the type described in U.S. application Ser. No. 913,215 the bar codes 20a, 20b and 20c can be decoded if that bar code is at a distance from the mirror of the scanner which is within its respective decode zone A, B, or C as illustrated by the bars A, B and C in FIG. 3B. More particularly, to decode a high density bar code, such as the code 20a, that code must be placed in the region A which covers the range of distances $D_1$ to $D_4$ from the scanner. A medium density bar code, such as code 20b, must be placed in the region B, which covers the range of distances $D_2$ to $D_5$ from the scanner, to be decoded. A low density bar code, such as 20c, must be placed in the region C, which covers the range of distances $D_3$ to $D_6$ from the scanner, to be decoded. It will be appreciated that the relative size and dimensions of each scanning zone may vary from scanner to scanner, depending upon such variables as the angular velocity of the mirror and the nature of the bar code to be decoded. The necessity for manually adjusting the distance between the bar code and the scanner arises as a result of the need to position the scanner with respect to the bar code so that the code elements are positioned within their corresponding decode zones A, B and C or in other words, at the proper distance from the scanner.

The present invention extends these decode zones for a range of code densities by varying the rotational rate or angular velocity of the shaft 28, and mirror 26, and therefore the instantaneous linear scanning velocity, V, of light beam 24 across the surface of a bar code target. This automatically normalizes the code element widths as a function of time without the necessity of moving the scanner relative to the bar code being scanned to vary the distance D. As a result, the aspect of trial and error scanner movement by the scanner operator in the prior art systems discussed above is minimized under most operating conditions in the subject invention. Generally, all the operator needs to do is to aim the scanner at a bar code to be scanned, and to initiate scanning With continuing reference to FIG. 3B, high element density bar codes which would normally decode in the region defined by area A which is relatively close to the scanner, may be effectively decoded virtually anywhere within the boundaries of the total scanner decode zone defined by region E, which covers distances $D_1$ through $D_6$ from the scanner. Similarly, the low element density bar code, which would normally decode in the region defined by region C may also be effectively decoded anywhere within the boundaries of the total scanner decode zone defined by area E. It should be noted that any portion of a bar code 20 which is moved inward closer to scanner 10, which falls beyond the maximum deflection angle theta $\theta$, as indicated by the solid, outwardly angled lines extending away from the mirror 26 and numbered 70 and 72 in FIG. 3B will not be capable of being decoded because it will extend beyond the deflection angle of the beam.

The code element normalization achieved as a result of varying the speed of scanning automatically compensates for a variety of decoding problems without the operator having to adjust the distance D from the scanner to the target on a trial and error basis.

Figure 4:
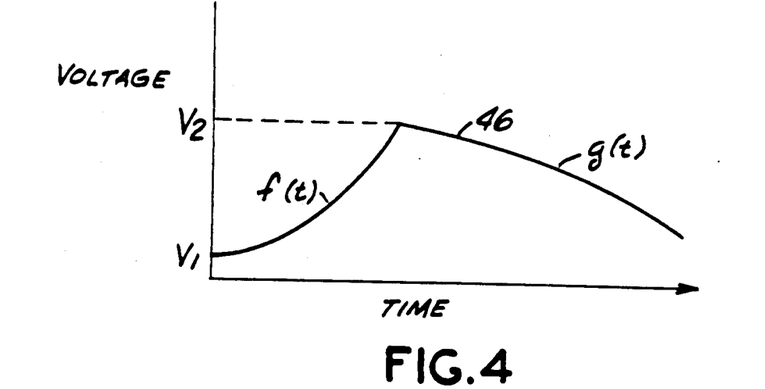
FIG. 4 is a graphic illustration of a drive signal for the stepper motor suitable for use in one embodiment of the present invention.

In the presently preferred embodiment of the present invention, the speed of scanning is varied by modulating the angular velocity, $\omega$ of the scanning mirror 26 This velocity modulation is accomplished in a first embodiment of the invention by substituting a varying voltage signal 46, as illustrated in FIG. 4 for the triangular driving signal 44 $V^{DRIVE}$ illustrated in FIG. 2B. Signal 46 is preferably one which monotonically changes between voltage values $V_1$ and $V_2$ and back to $V_1$. The steady change of a monotonic function avoids jerky motion of the mirror and consequently avoids distortion in decoding the bar code elements. As illustrated in FIG. 4, the function f(t) giving rise to the portion of the curve 46 in which the drive voltage increases from $V_1$ to $V_2$ differs from the function g(t) defining the portion of the curve 46 in which the drive voltage decreases from $V_2$ to $V_1$.

Generally speaking, any non-symmetrical signal can be used so long as it is monotonic in nature. Therefore, such signals as trigonometric, exponential, and algorithmic signals can be used. For example, referring now to FIG. 7, any or all of the drive signals 46a–46c can be used to obtain the desired scanning velocity variation of the subject invention. For the drive signals illustrated in FIG. 7, it can be seen that the slope of the signal between $V_1$ and $V_2$ and that for the portion of the signal between $V_2$ and $V_1$ can differ and can vary over time to accommodate a wide, dynamic range of scanning velocities. For example, signal frequency can be held constant and the slopes of the signals changed over time to vary from signal 46a to 46c. The signals can then be repeated in the reverse order or in any predetermined sequence and cycled over time to vary the angular velocity of the scanning mirror.

The modulation in angular velocity $d\theta/dt$ of the scanning mirror 26 can alternatively be accomplished with digital methods by using a predetermined algorithm in conjunction with a digital to analog converter. In this type of system, a microprocessor loads a register with a value which is then converted into an analog signal. The analog signal is then used to modulate the scanning frequency of the mirror. A simple velocity varying table could be implemented digitally in firmware as in the following example. Where 40 scans per decode attempt are to be performed, the first ten scans could occur at a "base" velocity n. The next ten scans could occur at a velocity of n+dn (dn being a small incremental change in velocity). The subsequent ten scans could occur at a velocity of n−dn, and the last ten scans could occur at the velocity n. Other incremental changes in scanning velocity, such as n plus or minus 2dn, 3dn, etc. could be performed with the scanning velocities arranged in any desired sequence. One suitable system for generating incremental changes in scanning velocity is illustrated in FIG. 5A.

Figure 5A:
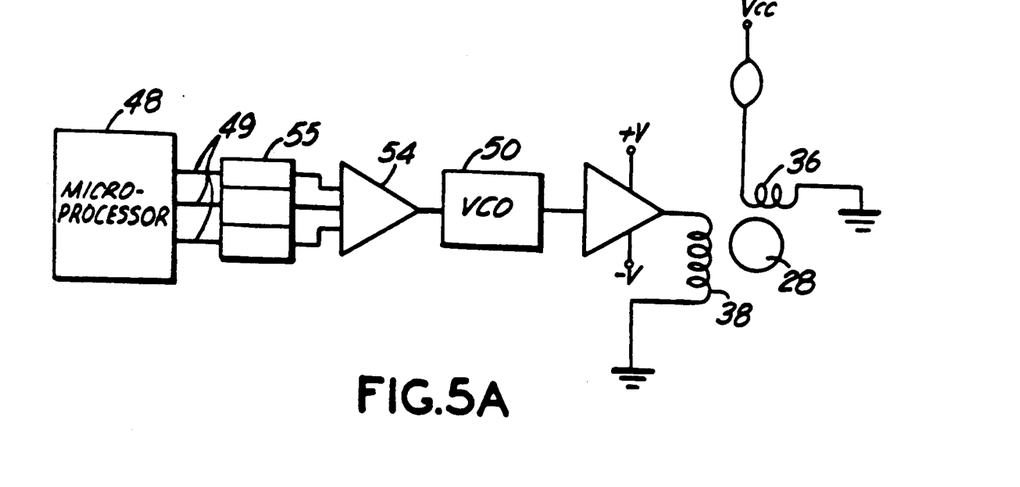
FIG. 5A is a schematic circuit diagram of a mirror motor drive circuit according to the present invention which uses predetermined fixed step increments to digitally control the speed of mirror rotation.

Referring to FIG. 5A, a microprocessor 48 is shown which has three output ports 49 to which digital data can be written under program control. These ports 49 are latched into a scan correction register 55 whose output in turn feeds a digital to analog converter 54. The converter 54 supplies an analog voltage with eight bit resolution to a voltage controlled oscillator 50. The output of the digital to analog converter 54 is a direct function of the digital input data provided on ports 49 by the microprocessor 48. For example, in the control shown in FIG. 5A, if the digital value is zero the analog output of converter 54 is zero volts; if the digital value is seven (111 binary) the analog output is five volts. Intermediate output values between zero and five volts are achieved with digital values between zero and seven in order to vary the frequency of oscillation of the scanning mirror 26 in step changes in any order desired by the operating program. The construction and programming of the control circuit of FIG. 5A or more complex control circuits to perform similar control functions are well within the skill of those of ordinary skill in the art.

Figure 5B:
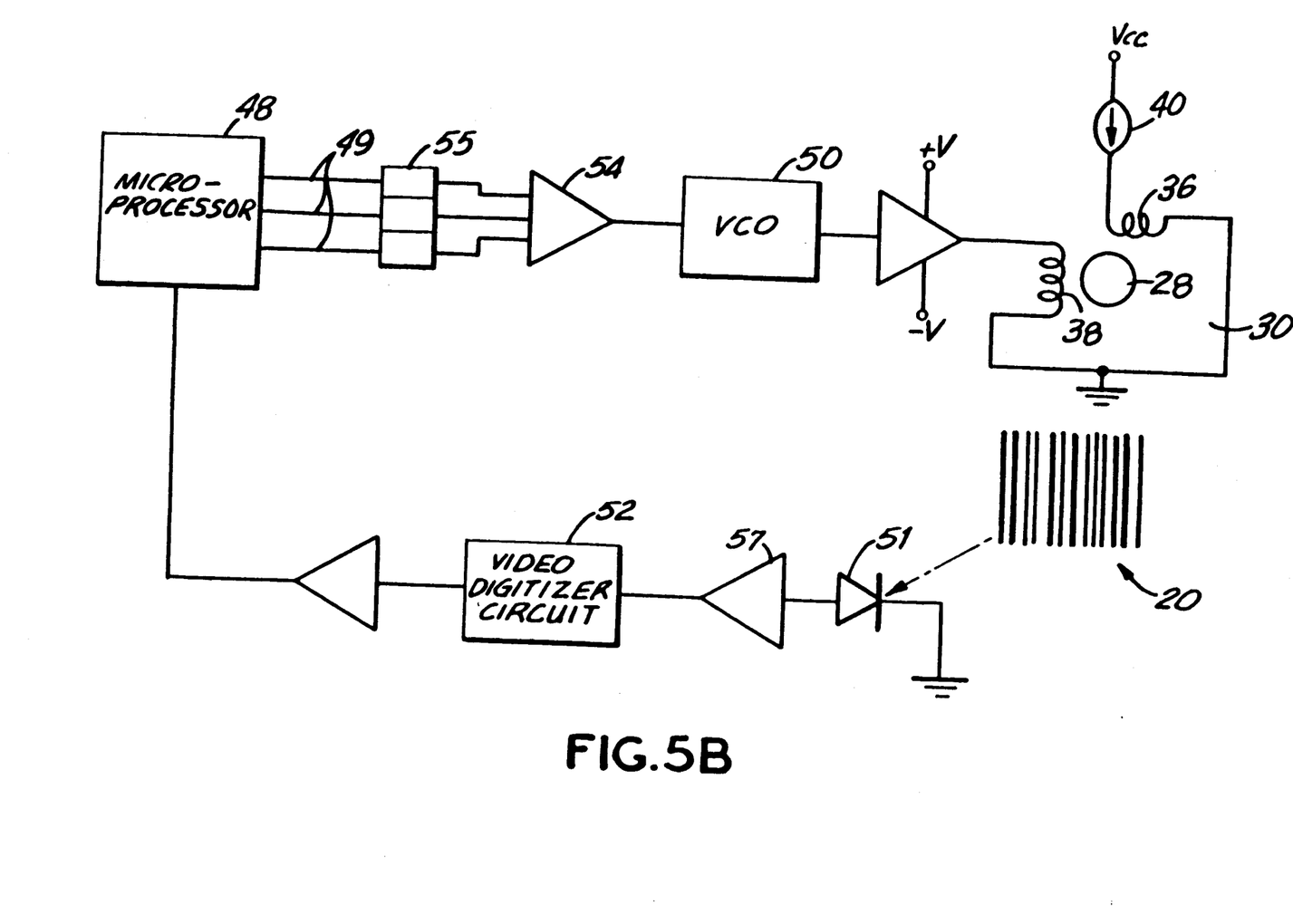
FIG. 5B is a block diagram of a further embodiment of the present invention depicting a microprocessor-controlled variable speed scanner which uses the reflected optical signal for feedback control of the scanning speed.

FIG. 5B illustrates a further embodiment of the present invention. The same driving system of FIG. 5A consisting of a microprocessor 48, scan correction register 55, digital to analog converter 54 and a voltage controlled oscillator 50 is employed with the addition of elements to provide input data to the microprocessor 48. The input data enables intelligent decisions to be made by the microprocessor 48 as to the value to be placed into the scan correction register 55 to enable proper decoding of the bar code 20.

Initially, a nominal value of three (binary 111) is set into the scan correction register 55. If no decode is established after scanning the bar code 20, microprocessor 48 uses input provided concerning the bar code 20, as described below to adjust the value input into scan correction register 55 and consequently to adjust the scanning velocity.

As scanning occurs, reflected light from the bar code 20 is received by a photodiode 51, converted to a voltage and amplified by an amplifier 57. The analog signals are then converted to digital pulses representing bars and spaces by the video digitizer circuit 52. The bit pattern is sent to the microprocessor 48, evaluated and a decision made as to what signal to send to the scan correction register 55. The operating program within microprocessor 48 evaluates the average frequency of the bit pattern, with the ideal frequency for decode being four (100 binary). As the bit pattern deviates from the ideal frequency, the mirror velocity can be adjusted by either increasing or decreasing the digital value in the scan correction register 55, as needed. The process is repeated on every scan until a successful decode of the bar code 20 is achieved.

Figure 5C:
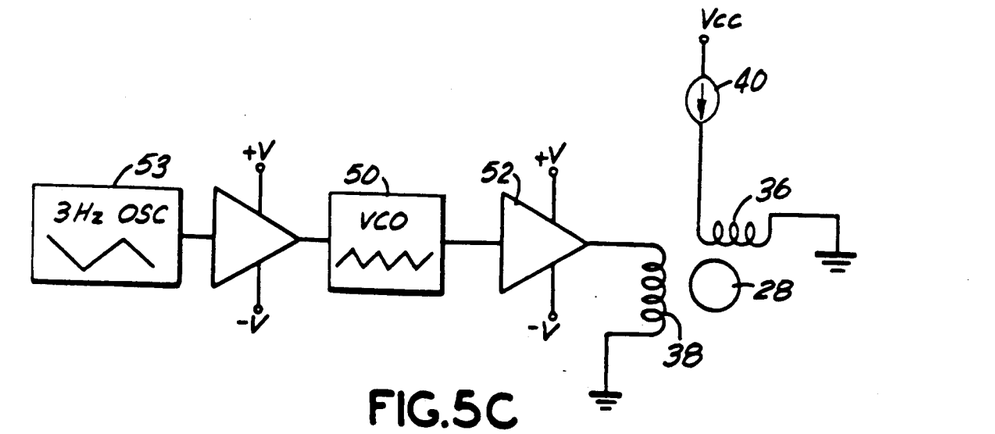
FIG. 5C is a schematic circuit diagram of the preferred embodiment of a second mirror motor drive circuit according to the present invention.
Figure 6:
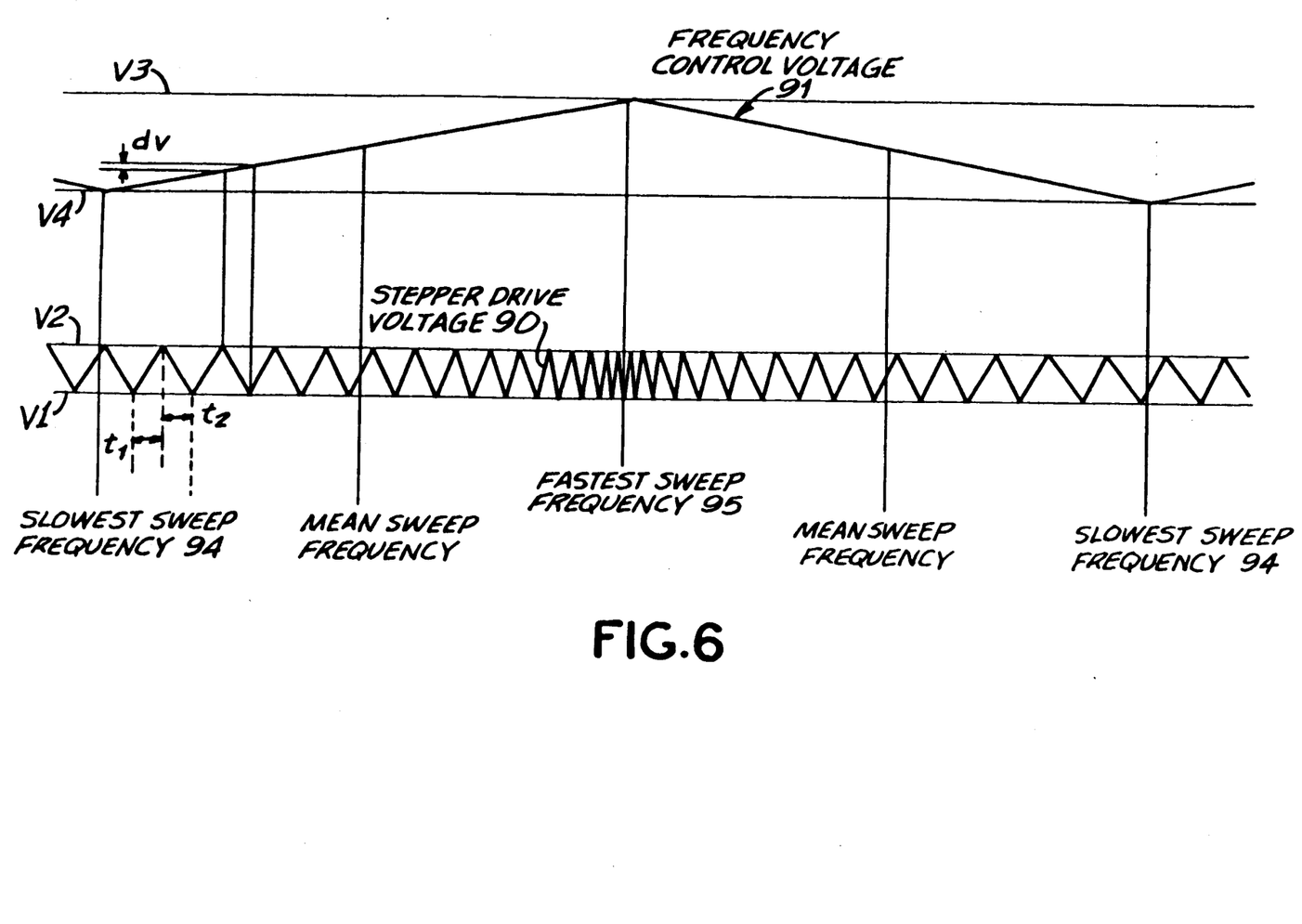
FIG. 6 is a graphic illustration of a drive signal for the stepper motor suitable for use in one embodiment of the present invention.

The preferred embodiment of the invention is illustrated schematically in FIG. 5C and by the related waveforms in FIG. 6.

Referring to FIG. 5C, a voltage controlled oscillator 50 provides a drive signal to a current driver 52. The output of current driver 52 drives the mirror shaft 28. An oscillator 53 oscillates at a fixed frequency of approximately 3 Hz. The output of oscillator 53 is fed through an amplifier to the voltage controlled oscillator 50 and provides the frequency control voltage for oscillator 50. As will be discussed below, a voltage wave form is applied to the coil 38 of FIG. 5A to control the deflection of the scanning mirror 26 by driving the shaft 28. This voltage waveform is referred to as the stepper drive voltage. One suitable stepper drive voltage 90 is illustrated in FIG. 6 and discussed below.

When the stepper drive voltage 90 of FIG. 6 increases from $V_1$ to $V_2$, the mirror deflects from left to right in the time $t_1$ that it takes to go from $V_1$ to $V_2$. When the stepper drive voltage decreases from $V_2$ to $V_1$ the mirror deflects from right to left in the time $t_2$. The total cycle time is equal to the sum of $t_1$ and $t_2$, which is also equal to one over the frequency of oscillation.

The frequency control voltage 91 varies from $V_4$ to $V_3$ and back again, and varies the total cycle time of the stepper drive voltage 90. The end result is a change in the time it takes to deflect the scanning mirror 26 left to right and right to left. Therefore the rate at which the scanning mirror 26 is deflected is dependent on the control voltage value during a particular cycle. When the control voltage 91 is at $V_4$ the total cycle time is the longest, and therefore is at the slowest sweep frequency 94. When the control voltage 91 is at $V_3$ the total cycle time is shortest, and therefore is at the fastest sweep frequency 95.

Figure 7:
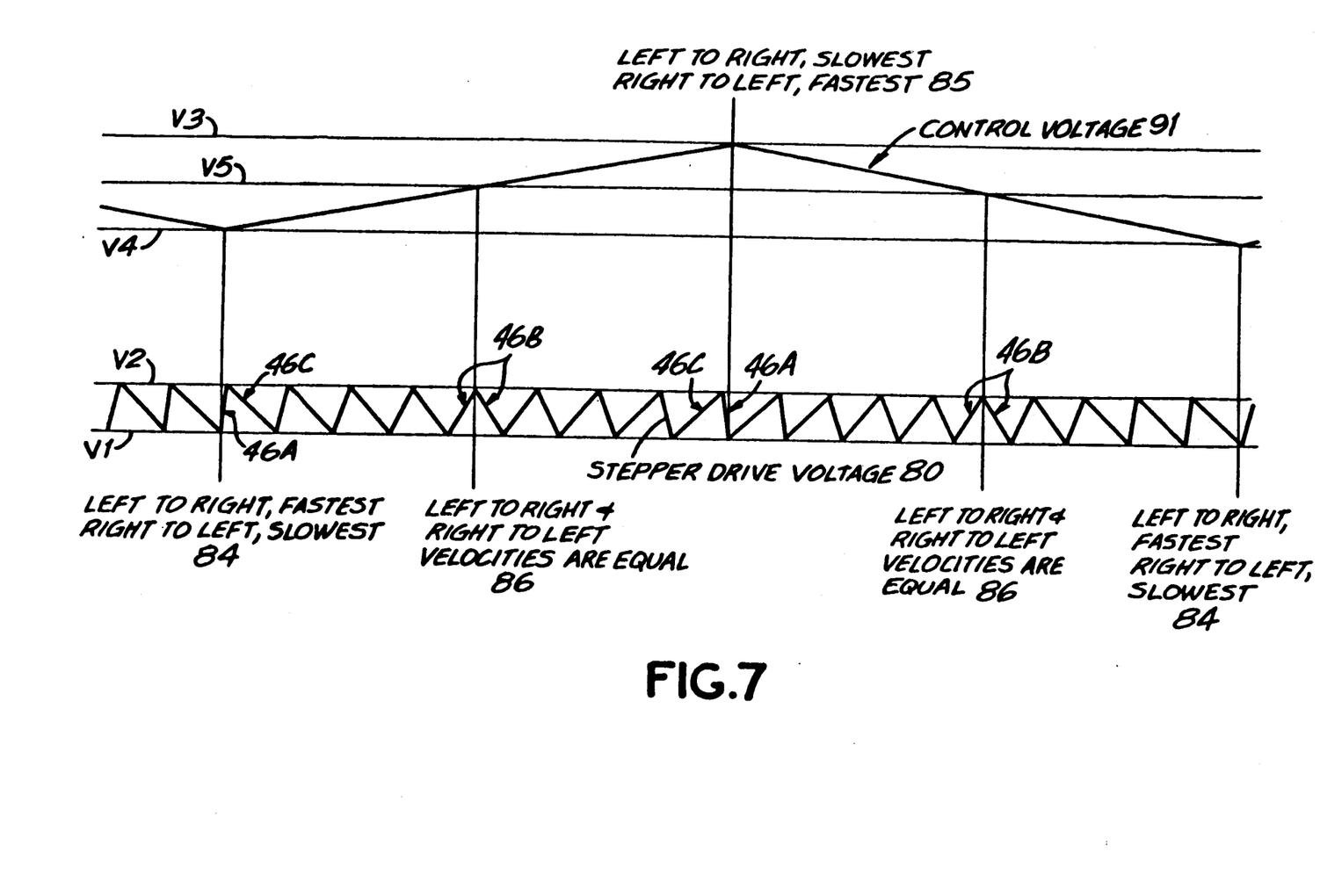
FIG. 7 is a graphic illustration of a drive signal suitable for driving the motor drive circuit of FIG. 5C.

The controlling voltage 91 to the voltage controlled oscillator 50 of FIG. 5C is supplied by the oscillator 53, and is a slowly varying voltage as depicted in FIG. 7. The controlling voltage 91 has a frequency of oscillation much slower than the stepper drive voltage 90, so that small changes in the control voltage (dv) are kept to a minimum during any one sweep of the mirror shaft 28 to produce a relatively linear and symmetrical motor drive voltage.

FIG. 7 illustrates a second stepper drive voltage 80 which is a variation of the stepper drive voltage 90 shown in FIG. 6. In FIG. 7 the frequency of oscillation of the scanning mirror 26 is held constant but the relative velocities left to right and right to left are distorted as a function of the control voltage 91. When the control voltage 91 is at $V_4$, the point labeled 84, the left to right velocity is fastest, but right to left is slowest. When the control voltage 91 reaches $V_3$, at the point labeled 85 in FIG. 7, the opposite is true; that is the right to left velocity is fastest and the left to right is slowest. At $V_5$, the point labeled 86 in FIG. 7, which occurs midway between $V_3$ and $V_4$, the scanning mirror 26 velocity is equal in both directions.

Figure 8A:
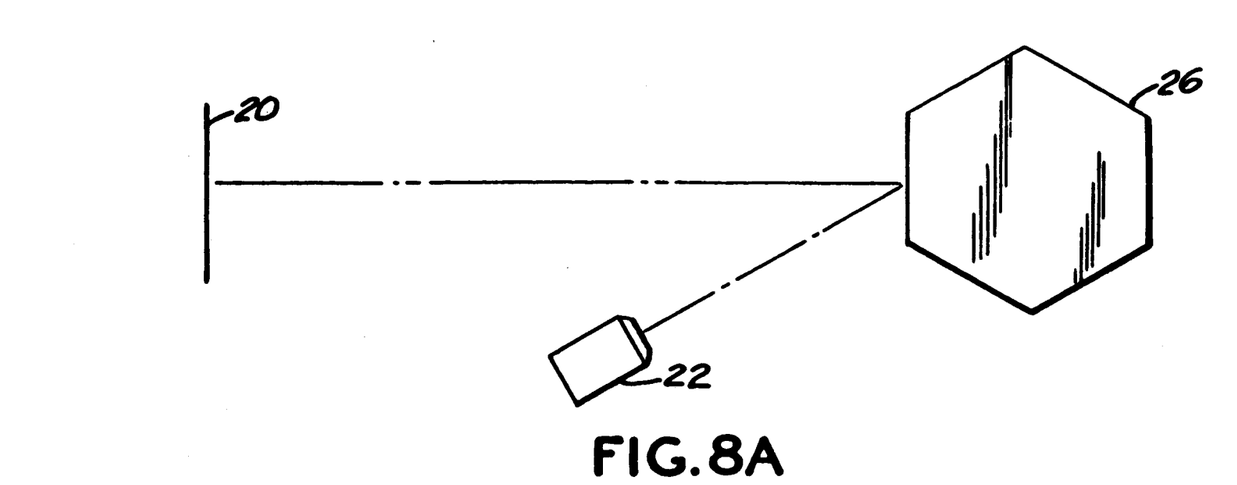
FIGS. 8A and 8B are schematic illustrations of a D.C. motor driving a multifaceted polygon.
Figure 8B:
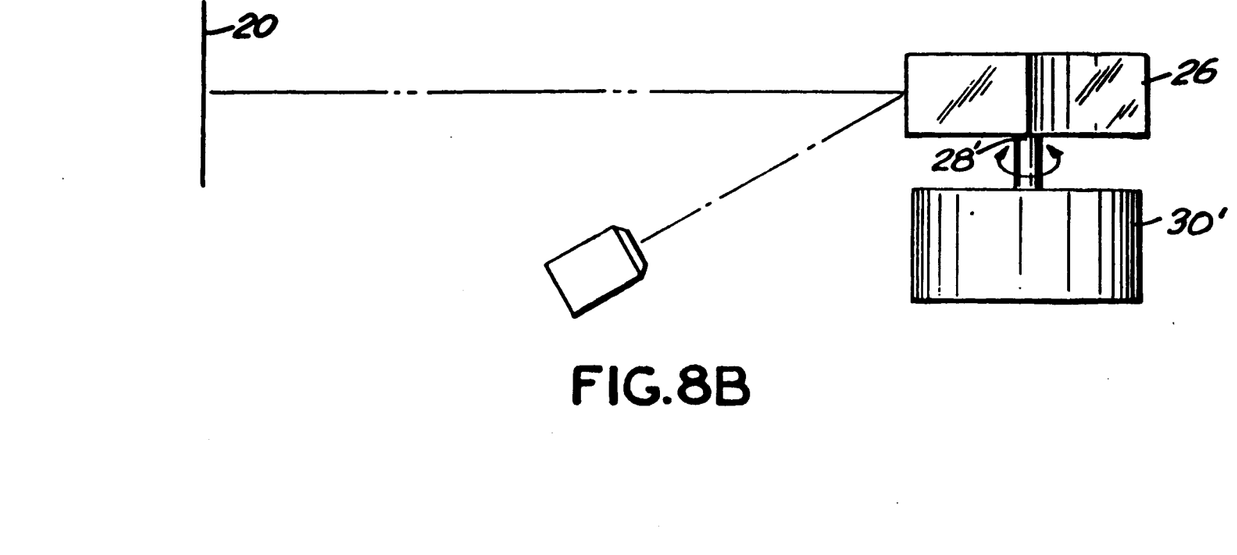

Motor means other than the stepper motor 30 may suitably be used as a galvanometer to provide the variable velocity scanning of the present invention. For example, a D.C. motor 30' may be used to rotate a single or multi-faceted reflecting polygon 26, as shown in FIGS. 8A and 8B. The angular velocity of shaft 28' can be varied by varying the D.C. voltage applied to drive the DC motor 30' as a function of time This type of a motor drive system can also be used with the type of control circuit shown in FIG. 5B and described above by using optical feedback to vary the motor speed in order to normalize the scanned code element densities.

Figure 9A:
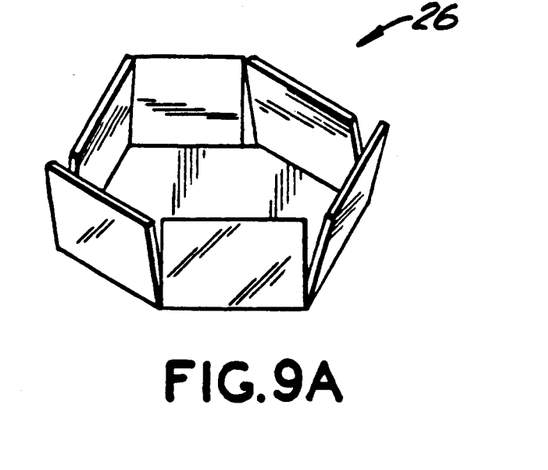
FIGS. 9A-9C are schematic illustrations of a multifaceted, multi-angular polygon for reflecting optical signals in various vertical planes.
Figure 9B:
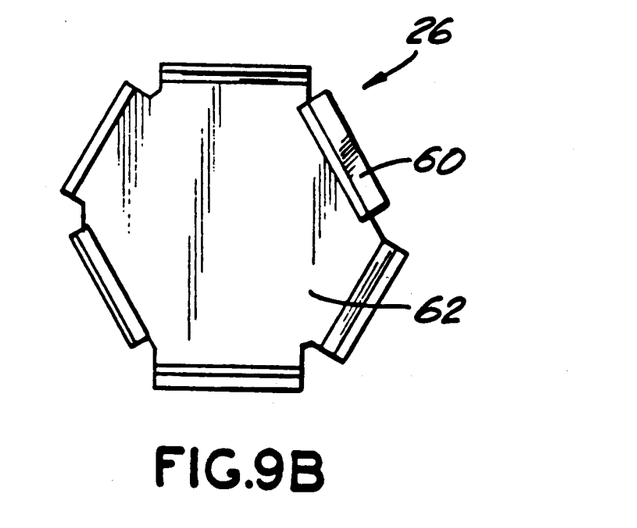
Figure 9C:
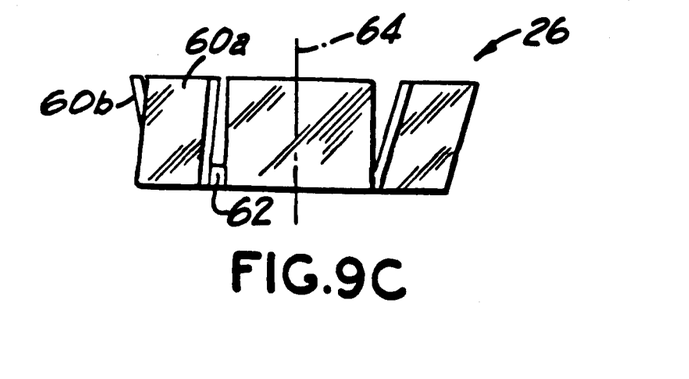

In a further embodiment of the invention, a multifaceted, multi-angular polygon, as shown in FIGS. 9A-9C, can be rotatably driven by either a stepper motor like the stepper motor 30 or a D.C. motor like the D.C. motor 30' discussed above. As shown in the FIGS. 9A-9C, polygon 26 comprises a plurality of mirror faces 60 which extend generally upwardly from a base portion 62. As is most clearly shown in FIGS. 9A and 9C, not all of the faces 60 extend from base portion 62 at the same angle. For example, in FIG. 9C it can clearly be seen that faces 60a and 60b extend at different angles from base portion 62 with respect to longitudinal axis 64. Variables such as the number of faces and the angular extension of the faces with respect to the base portion may be selected in accordance with the separation distance and relative velocity between the scanner and the object scanned, along with the overall size of the optical code to be decoded. In this system, in addition to not having to adjust distance manually, there is no need to adjust the vertical plane as well.

I claim:

1. An apparatus for variable speed scanning of an optically readable code, comprising:
   means for generating a light beam;
   means for deflecting said light beam across an optically readable code target, said code reflecting at least a portion of said light beam back toward said apparatus;
   means operatively connected to said deflecting means for automatically controlling the rate at which said light beam is deflected across said object so that the optically readable code is first scanned at a first scan velocity and then is scanned a second time at a second scan velocity; and means for processing said reflected portion of said light beam to decode the optically readable code target.

2. An apparatus according to claim 1, wherein said light beam generating means comprises a laser.

3. An apparatus according to claim 1, wherein said means for deflecting said light beam comprises at least one reflective surface.

4. An apparatus according to claim 3, wherein said at least one reflective surface is connected to a shaft rotatably driven by said means for controlling the rate at which said light beam is deflected, said means for controlling the rate comprising motor means connected to said shaft and a motor drive control means for varying the speed of the motor means.

5. An apparatus according to claim 4, wherein said motor means comprises a galvanometer.

6. An apparatus according to claim 4, wherein said motor means comprises a D.C. motor.

7. An apparatus according to claim 4, wherein said shaft rotates at a plurality of different rotation rates arranged in a prescribed sequence.

8. An apparatus according to claim 4, wherein said motor means is driven by a monotonically changing voltage signal from the motor drive control means.

9. An apparatus according to claim 1, wherein said optically readable code comprises a bar code.

10. An apparatus according to claim 1, wherein said rate varying means comprises motor means driven by a monotonically changing voltage signal.

11. An apparatus according to claim 1, wherein said light deflecting means comprises a rotatably driven polygon having a plurality of light reflecting faces.

12. An apparatus according to claim 11, wherein at least two of said plurality of reflective faces lie in different planes.

13. A compact, portable scanning device for decoding an optical code, comprising:

light generating means comprising a laser for generating a light beam;

reflecting means having at least one reflective surface for reflecting said light beam toward an optical code to be decoded;

motor means for rotatably driving said reflecting means;

control means for automatically varying the rate at which said motor means rotates said reflecting means so that said reflecting means is rotated at a first angular velocity during a fist scan and at a second angular velocity during a second scan; and processing means for processing at least a portion of said light beam reflected by said optical code.

14. A scanning device according to claim 13, wherein said motor means comprises a stepper motor operable in a galvanometer mode.

15. A scanning device according to claim 13, wherein said control means emits a monotonically changing voltage signal for driving said motor.

16. A scanning device according to claim 13, wherein said reflecting means comprises a plurality of reflective surfaces, at least two of which lie in different planes.

17. A scanning device according to claim 13, wherein said motor means comprises a shaft coupled to said reflecting means, said shaft being rotatably drivable at least two different rotation rates.

18. A scanning device according to claim 13, wherein said processing means is operatively connected to said control means to provide feedback control over the rate of shaft rotation.

19. A scanning device according to claim 13, wherein said motor means comprises a D.C. motor.

20. A scanning device according to claim 18, wherein said control means effects signal input to said motor means for rotatably driving said reflecting means so as to normalize said different code element densities.

21. A method for scanning an optically readable code comprising the following steps:

(a) generating a light beam and directing said light beam toward a reflective surface;

(b) rotating said reflective surface at a first angular velocity to deflect said light beam across the code elements of the bar code;

(c) sensing a portion of said deflected light beam that is reflected by said code elements;

(d) rotating said reflective surface at a second angular velocity different from said first angular velocity to deflect said light beam again across said code elements;

(e) sensing a portion of said deflected light beam deflected at said second angular velocity that is reflected by said code elements; and (f) evaluating said sensed portions of said deflected light beam to provide an indication of data associated with the optically readable code.

22. The method according to claim 21, wherein rotation of said reflective surface is effected by motor means, further comprising the step of driving said motor means with a monotonically changing drive signal.

23. The method according to claim 21, wherein said light beam is generated by a laser.

24. The method according to claim 21, wherein said reflective surface comprises a generally flat mirror mounted to a shaft rotatably driven by a monotonically changing drive signal.

25. The method according to claim 21, wherein said reflective surface comprises a polygon having a plurality of generally flat, reflective surfaces, said polygon being coupled to a rotatably driven shaft.

26. The method according to claim 21, wherein at least two of said reflecting surfaces lie in different planes.

27. The method according to claim 21, further comprising the step of utilizing said sensed portions of said deflected light beam to provide feedback control over the rate at which said reflective surface is subsequently rotated.

* * * * *

UNITED STATES PATENT AND TRADEMARK OFFICE
CERTIFICATE OF CORRECTION

PATENT NO. : 5,010,242
DATED : April 23, 1991
INVENTOR(S) : Frontino

It is certified that error appears in the above-indentified patent and that said Letters Patent is hereby corrected as shown below:

Column 1, line 22, insert --.-- after "elements".
Column 1, line 44, insert --.-- after "significance".
Column 1, line 47, insert --.-- after "signal".
Column 1, line 53, insert --.-- after "decoded".
Column 1, line 59, insert --.-- after "employed".
Column 3, line 39, insert --.-- after "shaft".
Column 4, line 39, insert --.-- after "width".
Column 4, line 65, insert --.-- after "discussed".
Column 5, line 13, delete "R1" preceding "and" and insert --R3--.
Column 5, line 15, delete "RI" and insert --R1--.
Column 5, line 27, insert --.-- after "position".
Column 6, line 41, insert --.-- after "scanned".
Column 6, line 50, insert --.-- after "elements".
Column 6, line 62, insert --.-- after "impeded".
Column 7, line 64, insert --.-- after "26".

Column 7, line 68, delete "V$^{DRIVE}$" and insert --V$_{DRIVE}$--.
Column 9, line 54, insert --90-- following "voltage".
Column 10, line 33, insert --.-- after "time".

Signed and Sealed this

Twenty-second Day of February, 1994

Attest:

BRUCE LEHMAN

Attesting Officer          Commissioner of Patents and Trademarks